United States Patent
Blum et al.

(10) Patent No.: US 11,223,523 B2
(45) Date of Patent: Jan. 11, 2022

(54) COMPARING PROTOCOLS OF MEDICAL IMAGING DEVICES

(71) Applicant: Siemens Healthcare GmbH, Erlangen (DE)

(72) Inventors: Christian Blum, Neunkirchen Am Brand (DE); Andreas Falkner, Nuremberg (DE); Robert Lapp, Nuremberg (DE)

(73) Assignee: SIEMENS HEALTHCARE GMBH, Erlangen (DE)

( * ) Notice: Subject to any disclaimer, the term of this patent is extended or adjusted under 35 U.S.C. 154(b) by 0 days.

(21) Appl. No.: 16/952,356

(22) Filed: Nov. 19, 2020

(65) Prior Publication Data

US 2021/0160135 A1 May 27, 2021

(30) Foreign Application Priority Data

Nov. 25, 2019 (DE) .................... 10 2019 218 156.2

(51) Int. Cl.
*H04L 12/24* (2006.01)
*H04L 29/08* (2006.01)

(52) U.S. Cl.
CPC ...... *H04L 41/0813* (2013.01); *H04L 41/0873* (2013.01); *H04L 67/12* (2013.01)

(58) Field of Classification Search
CPC .. H04L 41/0813; H04L 41/0873; H04L 67/12
See application file for complete search history.

(56) References Cited

U.S. PATENT DOCUMENTS

| 2012/0271840 | A1* | 10/2012 | Vosniak | ................. | G16H 40/63 |
| | | | | | 707/758 |
| 2018/0068070 | A1* | 3/2018 | Keil | ...................... | G06T 7/0014 |
| 2018/0330818 | A1* | 11/2018 | Hsieh | ..................... | G16H 40/60 |

FOREIGN PATENT DOCUMENTS

DE 102016216920 A1 3/2018

* cited by examiner

*Primary Examiner* — Kim T Nguyen
(74) *Attorney, Agent, or Firm* — Harness, Dickey & Pierce, P.L.C.

(57) ABSTRACT

A computer-implemented method is for comparing protocols. In an embodiment, the computer-implemented method includes first receipt of a first protocol relating to a performance of a measurement at a first medical device, including a plurality of first protocol steps; and second receipt of a second protocol relating to a performance of a measurement at a second medical device. The computer-implemented method further includes determination of a plurality of arrangements of the first protocol steps; determination of a plurality of comparison values, each of the comparison values being based on a comparison of the second protocol with one of the arrangements of the first protocol steps; determination of an agreement value based upon the plurality of comparison values; and provision of the agreement value.

20 Claims, 7 Drawing Sheets

COMPARING PROTOCOLS OF MEDICAL IMAGING DEVICES

PRIORITY STATEMENT

The present application hereby claims priority under 35 U.S.C. § 119 to German patent application number DE 102019218156.2 filed Nov. 25, 2019, the entire contents of which are hereby incorporated herein by reference.

FIELD

Embodiments of the application generally relate to protocols of medical imaging systems.

BACKGROUND

Protocols of medical imaging systems such as e.g. computed tomography systems (acronym: CT) or positron emission tomography systems (acronym: PET) comprise a plurality of parameters (in particular examination parameters, protocol parameters and/or measurement parameters) and/or parameter ranges (in particular examination parameter ranges, protocol parameter ranges and/or measurement parameter ranges), which describe the processes of medical imaging and settings to be used for medical imaging. In particular, such protocols contain instructions for performing various medical measurements (in particular recordings, examinations, image recordings). Protocols generally comprise various protocol steps that are necessary for the performance medical imaging. In this case, an individual protocol step can describe the performance of an individual element of an imaging examination; the plurality of protocol steps of a protocol can describe the process of a complete imaging examination or series of examinations including the reconstruction of the recorded data.

Such protocols are normally specific to certain types of imaging systems and/or imaging software versions and/or imaging system manufacturers. The examination parameters can also depend in particular on the physical properties of the hardware of the imaging system, e.g. on the maximum x-ray voltage of a computed tomography system.

It is advantageous to manage protocols for medical imaging devices via centralized protocol management systems. Such protocol management systems generally offer functions for storing various protocols and/or protocol versions of imaging systems. In particular, protocols in various versions and/or for various types of imaging examinations can be stored for a single imaging system, or protocols in various versions and/or for various types of imaging examinations can be stored for a plurality of imaging systems from the same or different manufacturers and/or types (CT, PET, etc.). Protocol management systems can also advantageously be used to install a new protocol on one of the managed imaging systems or to remove a protocol from one of the managed imaging systems.

A comparison of the various protocols and/or protocol versions is helpful to the user for the purpose of selecting the most suitable protocol for the corresponding application case, and/or for tracking alterations more easily and evaluating differences. In particular, a comparison of protocols can allow the user to perform imaging examinations with comparable results on different imaging devices.

The complexity of such a comparison is generally very high, since a large number of parameters and protocol steps must typically be compared and the various sources of the various protocols and/or protocol versions are very heterogeneous, for example:

protocols which relate to various body regions (e.g. head and abdomen), protocol versions between which a long timespan has elapsed, during which various alterations were implemented in the protocol versions over time, and protocol versions in which significant changes such as addition, modification or deletion of individual parameters and/or protocol steps were implemented.

In known methods of protocol comparison, the comparison of individual protocol steps and their parameters functions very well. However, structural alterations such as addition or deletion of individual protocol steps in various protocols for comparison lead to problems in the assignment of corresponding protocol steps from the respective protocols, since the assignment is no longer unambiguous due to the structural changes and no unambiguous identification feature is present.

Furthermore, the known methods do not take into consideration that the order of the protocol steps in the various protocols sometimes has no effect on the examination result (for example, in the case of a recording which involves a plurality of x-ray energies, it may be irrelevant which x-ray energy is used first). In particular, a change in the order of the protocol steps from one protocol to the next significantly complicates the assignment of those protocol steps to be compared from the respective protocol.

In a known method, that protocol step in the second protocol which most closely matches a first protocol step in the first protocol is sought, irrespective of its position. In this case, a loop encompassing all protocol steps of the first protocol is executed. Protocol steps of the second protocol which are already assigned are not reexamined, even if they could possibly match another protocol step of the first protocol more closely. Using this method, an alteration in the order of the protocol steps in the protocols to be compared can be understood subject to the simplifications described above. However, this method has problems if protocol steps have been deleted or added.

SUMMARY

At least one embodiment of the present invention provides a method which allows improved comparison of protocols.

Embodiments are directed to a method for comparing protocols, a device for comparing protocols, a computer program product and a computer-readable storage medium. Advantageous developments are set forth in the claims and in the following description.

A computer-implemented method is disclosed according to at least one embodiment of the invention, comprising:

firstly receiving a first protocol, the first protocol relating to a performance of a measurement at a first medical device and the first protocol including a plurality of first protocol steps;

secondly receiving a second protocol, the second protocol relating to a performance of a measurement at a second medical device;

firstly determining a plurality of arrangements of the plurality of first protocol steps, wherein pairs of the plurality of arrangements vary;

secondly determining a plurality of comparison values, wherein each of comparison values, of the plurality of comparison values, is based on a comparison of the second protocol with one of the plurality of arrangements of the plurality of first protocol steps;

thirdly determining an agreement value based upon the plurality of comparison values; and provisioning the agreement value.

At least one embodiment of the invention further relates to a comparison device for comparing protocols, comprising:

an interface, designed for first receipt of a first protocol relating to a performance of a measurement at a first medical device, the first protocol including a plurality of first protocol steps, and designed for second receipt of a second protocol relating to a performance of a measurement at a second medical device; and a computing device designed for first determination of a plurality of arrangements of the first protocol steps, wherein pairs of the plurality of arrangements vary, designed for second determination of a plurality of comparison values, wherein each of the plurality of comparison values is based on a comparison of the second protocol with an arrangement of the first protocol steps, designed for third determination of an agreement value based upon the plurality of comparison values, and wherein the interface is further designed for the provision of the agreement value.

Such a comparison device can be designed in particular to execute the method for comparing protocols and embodiments and/or aspects thereof as described above. The comparison device is designed to execute this method and aspects thereof, in that the interface and the computing unit are designed to execute the corresponding method steps.

At least one embodiment of the invention further relates to a computer program product with a computer program and a computer-readable medium. A largely software-based implementation has the advantage that comparison devices already in use can easily be retrofitted via a software update in order to work in the way described. In addition to the computer program, such a computer program product can optionally comprise additional elements such as e.g. documentation and/or additional components, as well as hardware components such as e.g. hardware keys (dongles, etc.) for using the software.

In particular, at least one embodiment of the invention also relates to a computer program product with a computer program which can be loaded directly into a memory of a comparison device, comprising program sections for executing all steps of the method for determining an agreement value of at least one embodiment when the program sections are executed by the comparison device.

In particular, at least one embodiment of the invention relates to a computer-readable storage medium on which are stored program sections that can be read and executed by a determination system and/or a training system in order to execute all steps of the method for comparing protocols of at least one embodiment when the program sections are executed by the comparison device.

At least one embodiment is directed to a non-transitory computer program product storing a computer program, directly loadable into a memory of a comparison device, including program sections for executing the method of an embodiment when the program sections are executed by the comparison device.

At least one embodiment is directed to a non-transitory computer-readable storage medium storing program sections, readable and executable by a comparison device to execute the method of an embodiment when the program sections are executed by the comparison device.

BRIEF DESCRIPTION OF THE DRAWINGS

The invention is described and explained in greater detail below with reference to the example embodiments illustrated in the figures, in which.

DETAILED DESCRIPTION OF THE EXAMPLE EMBODIMENTS

Figure 1:
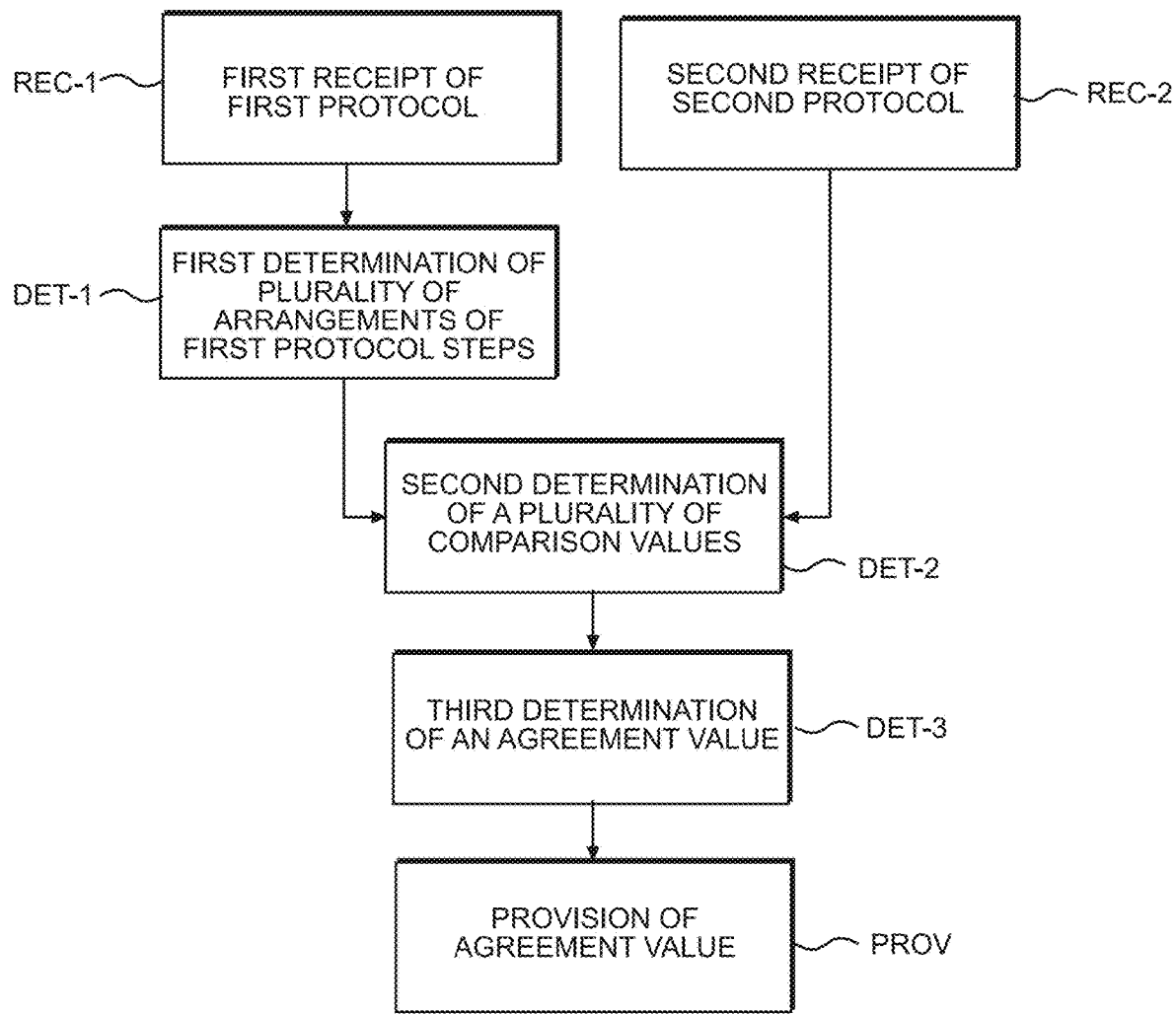
FIG. 1 shows a flow diagram of a first example embodiment for comparing protocols.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. The present invention, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one embodiment of the invention relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes;

etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

The manner in which the invention achieves the embodiments is described below, both in respect of the claimed devices and in respect of the claimed method. Features, advantages or alternative embodiment variants cited in this context apply equally to the other claimed subject matter and vice versa. In other words, the material claims (which are directed to a device, for example) can also be developed by the features that are described or claimed in connection with a method. The corresponding functional features of the method take the form of corresponding material modules in this case.

The computer-implemented method according to at least one embodiment of the invention for comparing protocols has as its starting point the receipt of a first protocol, in particular via an interface. In this context, the first protocol relates to a performance of measurements at a first medical device. In an example embodiment, the protocol can relate in particular to the performance or the measurement and reconstruction process on a medical imaging system. Moreover, the first protocol comprises a plurality of first protocol steps. In this case, the plurality of first protocol steps can comprise in particular all protocol steps of the first protocol. These protocol steps can describe in particular the measurement and reconstruction process of a medical imaging recording. In particular, an individual protocol step can describe an individual performance or the process of an examination or measurement in this case, and the plurality of protocol steps in a protocol can describe the process of a complete series of examinations including the reconstruction of the recorded data.

In a further method step of an embodiment a second protocol is received, in particular via the interface, relating to the performance of measurements at a second medical device. In particular, it can relate to the performance of measurements and reconstructions at a medical imaging system.

The first and the second medical device may vary in this context. The first and the second medical device may be from different manufacturers, have different hardware or software versions and/or be different types of imaging systems such as e.g. a magnetic resonance tomography system (acronym: MRT) and/or a CT. Alternatively, the first and the second medical device can also be identical. Via the first and/or the second medical device, it is possible to perform measurements of different body parts (e.g. thorax or head) and/or with different diagnostic objectives. In particular, various protocols may be available for these measurements. The different diagnostic objectives may result in a different choice of recording modes on a medical device, such that e.g. a T1 and a T2 weighted recording may be performed on an MRT according to the diagnostic objective. Alternatively, various versions of a protocol may be available on the medical device. In particular, the first protocol and the second protocol may be a first protocol version and a second protocol version of a base protocol.

In a further method step of an embodiment, a plurality of arrangements of the first protocol steps is determined, in particular via a computing unit, wherein pairs of said arrangements vary. An arrangement of the first protocol steps is in particular a permutation of the first protocol steps. When determining the plurality of arrangements, in particular the order of the first protocol steps is transposed for each arrangement, such that this order differs from the order of any other arrangement. When determining the plurality of arrangements, conditions can be specified which prohibit the transposition of individual first protocol steps.

In a further method step of an embodiment, a plurality of comparison values are determined, in particular via the computing unit, each of said comparison values being based on a comparison of the second protocol with an arrangement of the first protocol steps. In this case, different comparison values are preferably based on different arrangements of the first protocol steps. In this case, the second protocol can likewise comprise a plurality of second protocol steps, which can comprise in particular all protocol steps of the second protocol. When determining the comparison values, the order of the second protocol steps can be kept constant while a plurality of comparison values with arrangements of the first protocol steps can be determined, wherein pairs of said arrangements vary.

In a further method step of an embodiment, an agreement value based on the plurality of comparison values is determined via the computing unit in particular. In this case, the agreement value can be in particular a maximum and/or a minimum and/or an average of the plurality of comparison values. The agreement value is preferably the maximum of the plurality of comparison values.

In order to optimize the computing time of the computer-implemented method, if the agreement value is the maximum of the plurality of comparison values, it is possible to store only the largest comparison value and the associated arrangement of the plurality of first protocol steps. It is thereby possible to avoid the need to buffer the totality of the plurality of comparison values all at once. Via said optimization, it is possible to delete the smaller of two determined comparison values and the associated arrangement of the plurality of first protocol steps, and to save only the larger comparison value and the associated arrangement of the plurality of first protocol steps in the buffer.

In a further method step of an embodiment, the agreement value is provided via an interface in particular. If the agreement value is determined as the maximum and/or the minimum of the comparison values, the associated arrangement of the first protocol steps, whose comparison value corresponds to the maximum and/or the minimum of the comparison values, can also be provided. The agreement value is preferably determined as the maximum of the comparison values, since this signifies the best agreement of an arrangement of the first protocol steps with a second protocol. In this case, the provision of the agreement value can include storage, transfer and/or display of the agreement value.

The inventors have recognized that the comparison of a protocol with a plurality of arrangements of the protocol steps in a first protocol allows the determination of a global agreement value. If the maximum value of the plurality of comparison values is determined as an agreement value, the best agreement of a second protocol with an arrangement of first protocol steps is determined. If the two associated protocol versions are also output, further method steps relating to the selection of a suitable protocol can be initiated by the user based upon this knowledge. The inventors have recognized that the plurality of comparisons of various arrangements results in greater reliability for the choice of the best agreement with a maximum agreement value. It is therefore possible in particular to reduce the required storage volume for the protocols, since it is possible to store just one version of similar protocols. It is thus possible to avoid a plurality of similar protocols existing in parallel and occupying storage volumes.

According to a further embodiment of the invention, the method comprises the replacement of the first protocol on the first medical device by the second protocol, or the deletion of the first protocol on the first medical device, if the agreement value exceeds a predetermined threshold value. In this case, the medical device can be a medical imaging system in particular. In an example embodiment, the threshold value can be specified flexibly as a function of the desired degree of agreement which must be present in order to identify two protocols as being so similar that they can reciprocally replace each other.

The inventors have recognized that as a result of the existence of similar protocols or protocol versions on one or more medical devices, which are nonetheless deployed for the same type of measurements, inconsistencies can occur in the measurements or in the results. In particular, these inconsistencies can also lead to misinterpretations of measurements. By replacing similar protocols, it can be ensured that comparable measurements are performed using identical protocols on one or on various medical devices, and consistency of different measurements can be achieved on the medical device or medical devices. It is thereby possible in particular to reduce or prevent misinterpretations of the measurements.

According to a further embodiment of the invention, the first protocol is received via a user input. The first protocol is incompatible with the second medical device in this case. This aspect further comprises controlling the second medical device based upon the second protocol if the agreement value exceeds a predetermined threshold value.

For different medical devices, first and second protocol steps which initiate the same action may differ. This means that the first protocol of the first medical device might not be used for the same measurement at the second medical device in some circumstances. Incompatible means in particular that a first protocol cannot be used to control a second medical device.

Via the method for comparing protocols, it can be possible in example embodiments nonetheless to assign the first and second protocol steps to each other. In particular, it can therefore be possible to determine the agreement value of a first protocol of a first medical device and a second protocol of a second medical device, wherein the first protocol steps which initiate the same actions as the second protocol steps may be designed differently. The allows the centralized management of a plurality of different protocols of a plurality of medical devices, wherein those protocol steps of the individual medical devices which initiate the same action may be designed differently. In example embodiments, the centralized management can include the determination of agreement values of various protocols.

The centralized management of the plurality of protocols can include in particular receiving a first protocol of a first medical device, then searching in the plurality of protocols in the centralized management for a second protocol, of a second medical device, which has the highest agreement value with the first protocol. The first and the second protocols may be incompatible in this case. Following thereupon, an examination and/or measurement is performed at the second medical device based upon the second protocol, which examination and/or measurement is comparable with an examination and/or measurement performed at the first medical device based upon the second protocol.

The inventors have recognized that as a result of incompatibilities between two medical devices, it is not possible to guarantee uniformity or reproducibility of the measurements. The inventors have recognized that via comparing two incompatible protocols of two incompatible medical devices, it can be ensured that an examination or measurement is reproducible despite the use of incompatible medical devices. Reproducible means that the same measurement processes are performed at incompatible medical devices, wherein the measurement processes are determined by the protocol steps. In particular, it is possible thus to compare two examinations from incompatible medical devices.

According to a further embodiment of the invention, the plurality of arrangements of the first protocol steps comprises all those permutations of the first protocol steps which satisfy a predefined condition. In particular, a predefined condition can stipulate that certain pairs of protocol steps must not be transposed. In particular, the predefined condition can also include no condition, whereby all possible permutations of the first protocol steps correspond to the plurality of arrangements of the first protocol steps. It is therefore possible to ensure that of all possible combinations, that with the highest agreement is determined, wherein all possible arrangements in the form of all permutations are checked. This allows a global agreement value to be determined.

The inventors have recognized that a comparison of all permutations of the steps of a first protocol with a second protocol returns a global comparison. By comparing the resulting comparison values, it is possible to determine a global agreement value for all possible permutations or combinations or assignments of the protocol steps. The determination of a global agreement value ensures that the arrangement of first protocol steps which best matches the second protocol can be determined irrespective of the original arrangement of the first protocol steps. In particular, it can thus be ensured that when replacing a first protocol with a second protocol or when deleting a second protocol, based upon the agreement value with a first protocol, it is possible to proceed from the best global agreement. The best global agreement is determined by the maximum agreement value in this case.

According to a further embodiment of the invention, the method includes the insertion of null elements into the first protocol or the second protocol such that the number of first protocol steps corresponds to the number of second protocol steps, said second protocol comprising a plurality of second protocol steps.

The term null element in this context can be used synonymously to the terms place holder and neutral element. The number of protocol steps can be increased by one by insertion of a null element, without changing the measurement and/or reconstruction process defined by the protocol steps. The insertion of the null elements in this case is advantageously performed before the first determination of a plurality of arrangements of the first protocol steps. In particular, where there is plurality of protocols to be compared, that protocol in which the lowest number of null elements was inserted can be selected as a comparison protocol. All other protocols in the plurality of protocols can be compared with this comparison protocol. In particular, the order of the protocol steps of this comparison protocol can remain unchanged for the comparisons, while the protocol steps of all other protocols in the plurality of protocols are permuted and a comparison value is calculated for each arrangement of the protocol steps, wherein pairs of said arrangements vary.

The inventors have recognized that by inserting null elements, it is possible during the comparison to compensate for the deletion or removal and/or the addition of protocol steps between two protocols. A protocol step from the first protocol, for which no equivalent can be found in the second protocol, can be assigned a null element of the second protocol as best equivalent, or a protocol step from the second protocol, for which no equivalent can be found in the first protocol, can be assigned a null element of the first protocol as best equivalent.

It is thus possible to allow for an unequal number of first and second protocol steps, which occurred as a result of deleting and/or adding a protocol step, when determining the comparison values. Therefore the original arrangement of the first protocol steps is not relevant to the determination of the agreement value. Two protocol steps assigned to each other signifies in this case that they lie at the same position in that arrangement of the first and second protocol steps for which the agreement value, preferably the maximum comparison value, was provided. In other words, the first of the first protocol steps is assigned to the first of the second protocol steps, the second of the first protocol steps is assigned to the second of the second protocol steps and so on.

According to a further embodiment of the invention, the second protocol comprises a plurality of second protocol steps, wherein each of the comparison values is based on a plurality of comparisons of respectively one of the first protocol steps and one of the second protocol steps. In particular, in this way each comparison of a first protocol step with a second protocol step can be performed independently of a comparison of other protocol steps. In particular, for a first arrangement of the first protocol steps, the comparison is executed for each first protocol step with the second protocol step in the corresponding order. It is therefore possible as a result of the individual comparisons to determine a number of protocol step comparison values, corresponding to the number of protocol steps in the first and/or second protocol. The comparison value for a second protocol with a first arrangement of the first protocol steps can be determined from the plurality of these protocol step comparison values. For example, the average, the maximum value or the minimum value of all protocol step comparison values can be determined as a comparison value. The average or the sum of all protocol step comparison values is preferably determined as a comparison value.

According to a further embodiment of the invention, in the context of the method, each of the first and second protocol steps comprises a protocol step identifier and/or a plurality of parameter pairs. A parameter pair comprises a parameter identifier and an associated parameter value. The second determination is then based on the protocol step identifier and/or the plurality of parameter pairs.

According to a preferred embodiment of the invention, in the context of the method, each of the first protocol steps comprises a protocol step identifier. The second determination is then based on the protocol step identifier.

According to a further preferred embodiment of the invention, in the context of the method, each of the first and second protocol steps comprises a plurality of parameter pairs. A parameter pair comprises a parameter identifier and an associated parameter value. The second determination is then based on the plurality of parameter pairs.

According to a further preferred embodiment of the invention, in the context of the method, each of the first and second protocol steps comprises a protocol step identifier and a plurality of parameter pairs. A parameter pair comprises a parameter identifier and an associated parameter value. The second determination is then based on the protocol step identifier and the plurality of parameter pairs.

The protocol step identifier describes the associated first or second protocol step in this case. In particular, the protocol step identifier can contain information about the body part to be examined in the first or second protocol step and/or about the examination and/or reconstruction performed in the first or second protocol step. In this case, a parameter pair describes parameters which are required for performing the corresponding first or second protocol step. The parameter identifier describes which parameter is concerned in this case, while the parameter value describes which value the parameter is to assume. The parameter value can be a numeric or a string value in this case. String values include combinations of characters. The parameter value can advantageously be empty in a parameter pair, particularly if the parameter described by the associated parameter identifier is not used in the corresponding first or second protocol step. The plurality of parameter identifiers for all first or second protocol steps can advantageously be identical, such that only the parameter values of the first or second protocol steps differ. In particular, the expressions "a parameter value is associated with a parameter identifier" and "a parameter identifier is associated with a parameter value" can be used synonymously.

According to a further embodiment of the invention, the determination of a comparison value for an arrangement of the first protocol steps comprises the following additional method steps. In a first method substep, a first partial comparison value is determined based upon the protocol step identifier of the first protocol step that is to be compared and the protocol step identifier of the second protocol step. In a second method substep, a second partial comparison value is determined based upon the parameter pairs of the first and second protocol step that are to be compared. Following thereupon, a protocol step comparison value of the first protocol step that is to be compared and the second protocol step is calculated by adding the first and second partial comparison values.

In a final method substep, the comparison value is calculated based upon the protocol step comparison values. In this case, the comparison value can be a maximum, a minimum, a sum or an average of all protocol step comparison values. When determining the second partial comparison value, parameter values are advantageously compared whose associated parameter identifiers agree in the first and second protocol steps. In particular, only the comparison of two parameter values contributes to the second partial comparison value. The associated parameter identifier is used to assign the reciprocally corresponding parameter values in the first and the second protocol step. If the parameter value is a numerical value, where there is agreement of the first parameter value with the second parameter value, an agreement of 100% can be assumed.

In the case of unequal parameter values for the same parameter identifier, a 0% agreement can be assumed. If the parameter values are string values, a percental agreement can be determined. A percental agreement can be determined similarly for the protocol step identifier of the first and second protocol step. The sum of all agreements of the parameter values and protocol step identifiers of the first and second protocol can form the protocol step comparison value for the comparison of a first protocol step with a second protocol step.

According to a further possible embodiment of the invention, a comparison of a first protocol step with a second protocol step is based on a comparison of the protocol step identifier of the first protocol step with the protocol step identifier of the second protocol step and on a comparison of the plurality of parameter pairs of the first protocol with the plurality of parameter pairs of the second protocol, wherein the plurality of parameter identifiers of the first protocol and the plurality of parameter identifiers of the second protocol are identical. The comparison of the plurality of parameter values of the first and the second protocol, said parameter values being associated with the same parameter identifiers, is performed for each parameter identifier.

If a first protocol step of the first protocol has, in the plurality of parameter identifiers, a parameter identifier which is not present in the plurality of parameter identifiers of the second protocol step of the second protocol, a 0% agreement can preferably be assumed for the comparison of this parameter identifier and this parameter value. In particular, parameter identifiers of the first and second protocol which are not identical but are similar can be recognized as identical and their associated parameter values compared. For example, the parameter identifier 'Acquisition time' can be set as identical to the parameter identifier 'Recording time' and their associated parameter values compared with each other.

According to a further embodiment of the invention, the first protocol steps comprise first scan protocol steps and first reconstruction protocol steps, wherein each first scan protocol step has a plurality of subordinate first reconstruction protocol steps.

Each protocol can include a sequence of a plurality of scan protocol steps, and each of these scan protocol steps can be followed by at least one reconstruction protocol step or by no reconstruction protocol steps. Since the assignment of the reconstruction protocol steps to a respective scan protocol step cannot be changed in a protocol and the reconstruction protocol steps always follow the scan protocol steps, reconstruction protocol steps are said to be subordinate to a scan protocol step.

Similarly, the second protocol steps can comprise second scan protocol steps and second reconstruction protocol steps, wherein each second scan protocol step has a plurality of subordinate second reconstruction protocol steps.

According to a further embodiment of the invention, the plurality of arrangements is determined in such a way that the subordination structure of the first scan protocol steps and the first reconstruction protocol steps is retained. In particular, the assignment of a plurality of first reconstruction protocol steps to a first scan protocol step within a first protocol cannot be effectively varied without changing the measurement that is to be performed by the first protocol. If the subordination structure was changed, the protocol would no longer describe the desired measurement.

The inventors have recognized that a change in the subordination structure of the scan protocol steps and the reconstruction protocol steps would change a protocol in such a way that it no longer satisfies the original purpose. In other words, in the event of a change in the subordination structure, the measurement and reconstruction process which is described by the sequence of protocol steps would be changed in such a way as to produce a process that is not comparable. The inventors have recognized that the retention of the subordination structure therefore results in a better comparison. Moreover, the inventors have recognized that by avoiding such transpositions which change the subordination structure, when comparing two protocols in accordance with the method described, computing time can be saved and the calculation of the agreement value thus accelerated.

According to a further embodiment of the invention, when determining the arrangements of the first protocol steps, only those arrangements are determined in which the order of the first scan protocol steps is unchanged. In particular, if only the plurality of arrangements of the first scan protocol steps are examined, only the position of the null elements is changed. In particular, the number of possible permutations for a comparison depends inter alia on the number of null elements and the number of possible positions of the null elements. In this case, two null elements can be identical in an example embodiment. This means that no distinction is made between the null elements. This further reduces the number of possible permutations for the comparison. In particular, the equal treatment of all null elements when determining the plurality of arrangements of the first protocol steps reduces the computing time required to determine the agreement value, since fewer arrangements of the first protocol steps are compared.

According to a further embodiment of the invention, the second protocol steps comprise second scan protocol steps and second reconstruction protocol steps, wherein each second scan protocol step is assigned a plurality of subordinate second reconstruction protocol steps. In this case, the determination of a plurality of arrangements of the first protocol steps, wherein pairs of said arrangements vary, and the determination of a plurality of comparison values, wherein each of the comparison values is based on a comparison of the second protocol with one of the arrangements of the first protocol steps, are executed independently of each other for the first and second scan protocol steps and for the first and second reconstruction protocol steps.

In particular, independently of each other in this context signifies that the two cited method steps are initially performed for the first and second scan protocol steps, without considering the first and second reconstruction protocol steps. Following thereupon, the two cited method steps are performed for the reconstruction protocol steps. In particular, the subordination structure of the reconstruction protocol steps relative to the respective scan protocol steps must not be changed. As a result of this, subsets of the first and second reconstruction protocol steps are compared with each other in each case, whose superordinate first and second scan protocol steps were assigned to each other in the preceding comparison. This means that the two method steps cited above (determining a plurality of arrangements and determining a plurality of comparison values) are applied to subsets of the first and second reconstruction protocol steps. Therefore the word independent in this context means inter alia that no comparisons are performed between scan protocol steps and reconstruction protocol steps.

The inventors have recognized that a distinction between scan protocol steps and reconstruction protocol steps both accelerates the comparison relative to time and minimizes erroneous assignments of first and second protocol steps. Since scan protocol steps and reconstruction protocol steps are different subtypes of protocol steps, a comparison of a scan protocol step and a reconstruction protocol step is not meaningful since they cannot correspond to each other. Since these comparisons are not performed, and only first scan protocol steps are compared with second scan protocol steps and first reconstruction protocol steps with second reconstruction protocol steps, computing time and computing power are saved and erroneous assignments are avoided.

In addition to the determination of a comparison value via comparing a plurality of arrangements of first protocol steps with a second protocol in accordance with the method proposed here, the prior art discloses an alternative method known as a fast-forward algorithm. According to this algorithm, from the plurality of second protocol steps, that protocol step which most closely matches the first of the first protocol steps is initially sought. Following thereupon, from the plurality of second protocol steps, that protocol step which most closely matches the second of the first protocol steps is sought, wherein that second protocol step already assigned to the first of the first protocol steps is no longer considered in this search. In particular, each protocol step from the plurality of first protocol steps can be assigned a protocol step from the plurality of second protocol steps if both protocols comprise an equal number of protocol steps. Alternatively, the last protocol steps in the arrangement of protocol steps of the protocol which comprises a larger number of protocol steps are not assigned a protocol step of the other protocol.

According to a possible embodiment of the invention, this fast-forward algorithm can also be executed with reference to the subordination structure of the first and second scan protocol steps and the first and second reconstruction protocol steps, in that the assignments of the first and second scan protocol steps and of the first and second reconstruction protocol steps are executed independently of each other and in that, during the assignment of the first and second reconstruction protocol steps, the dependency on the superordinate scan protocol steps is taken into consideration. The subordination structure is therefore retained as in the proposed method for comparing protocols. Assigning a first protocol step to a second protocol step when using the fast-forward algorithm means that, for the first protocol step, it is possible to determine the highest protocol step comparison value for the combination with the assigned second protocol step, in comparison with the plurality of protocol step comparison values of the plurality of combinations of the first protocol step with protocol steps from the plurality of second protocol steps.

According to a possible embodiment of the invention, before each calculation of a comparison value, the number of the protocol steps to be compared is determined in one of the two protocols. The method by which the comparison value will be determined is selected as a function of the number. In the case of a number smaller than or equal to 9, the comparison value is determined via the method for comparing protocols. In the case of a number larger than 9, the comparison value is determined via the fast-forward algorithm. This prevents the computing time for determination of the comparison value from becoming too great, since the number of possible permutations increases as the number of protocol steps grows. If the comparison value for scan protocol steps and reconstruction protocol steps is determined separately, only the number of protocol steps used for the calculation of the partial comparison is determined.

The inventors have recognized that in most cases the number of protocol steps to be compared in a protocol does not exceed 9. By virtue of the possibility for alternatively calculating the comparison value using the fast-forward algorithm for a number larger than 9, the computing times are prevented from becoming excessive.

At least one embodiment of the invention further relates to a comparison device for comparing protocols, comprising an interface and a computing unit, wherein the interface is designed for the first receipt of a first protocol relating to a performance of a measurement at a first medical device, wherein the first protocol comprises a plurality of first protocol steps, wherein the interface is further designed for the second receipt of a second protocol relating to a performance of a measurement at a second medical device, wherein the computing unit is designed for the first determination of a plurality of arrangements of the first protocol steps, wherein pairs of said arrangements vary, wherein the computing unit is further designed for the second determination of a plurality of comparison values, wherein each of the comparison values is based on a comparison of the second protocol with an arrangement of the first protocol steps, wherein the computing unit is further designed for the third determination of an agreement value based upon the plurality of comparison values, and wherein the interface is further designed for the provision of the agreement value.

Such a comparison device can be designed in particular to execute the method for comparing protocols and embodiments and/or aspects thereof as described above. The comparison device is designed to execute this method and aspects thereof, in that the interface and the computing unit are designed to execute the corresponding method steps.

At least one embodiment of the invention further relates to a computer program product with a computer program and a computer-readable medium. A largely software-based implementation has the advantage that comparison devices already in use can easily be retrofitted via a software update in order to work in the way described. In addition to the computer program, such a computer program product can optionally comprise additional elements such as e.g. documentation and/or additional components, as well as hardware components such as e.g. hardware keys (dongles, etc.) for using the software.

In particular, at least one embodiment of the invention also relates to a computer program product with a computer program which can be loaded directly into a memory of a comparison device, comprising program sections for executing all steps of the method for determining an agreement value of at least one embodiment when the program sections are executed by the comparison device.

In particular, at least one embodiment of the invention relates to a computer-readable storage medium on which are stored program sections that can be read and executed by a determination system and/or a training system in order to execute all steps of the method for comparing protocols of at least one embodiment when the program sections are executed by the comparison device.

FIG. 1 shows a flow diagram of a first example embodiment of the method for comparing protocols P1, P2, P3.

The first method step of the illustrated first example embodiment is the first receipt REC-1 of a first protocol P1 via an interface 701. The first protocol P1 can describe the measurement process at a first medical device. In the illustrated first example embodiment, the first medical device is a computed tomography system. Alternatively, the first medical device can involve flat-image x-ray, MRT, PET, SPECT (Single Photon Emission Computed Tomography), etc. The first protocol P1 in this case comprises a plurality of first protocol steps S1.1, S2.1, S3.1, R1.1, R2.1, R4.1, R5.1, PS, St1.1, St2.1, St3.1.

The second method step of the illustrated first example embodiment is the second receipt REC-2 of a second protocol P2 via an interface 701. The second protocol P2 here describes the measurement process at a second medical device. In the illustrated example embodiment, the second medical device is likewise a computed tomography system but is not identical to the first medical device. Alternatively, the first and second medical devices can be identical. The second protocol P2 here comprises likewise a plurality of second protocol steps S1.2, S2.2, S3.2, R1.2, R2.2, R4.2, R5.2, PS, St1.2, St2.2, St3.2.

Figure 5:
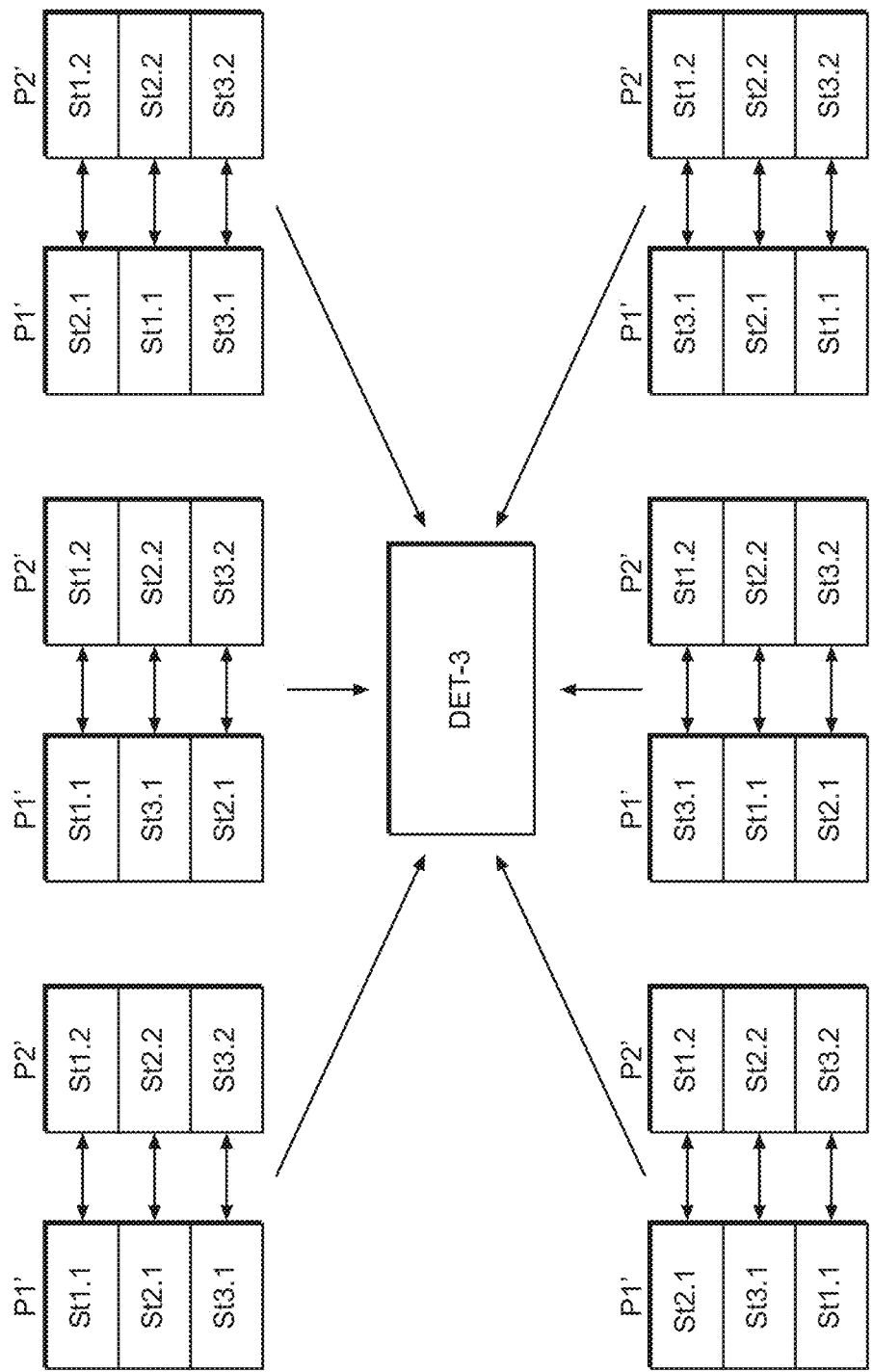
FIG. 5 shows a schematic diagram of the comparison of two protocols using permutation.

The next method step of the illustrated first example embodiment is the first determination DET-1 of a plurality of arrangements of the first protocol steps S1.1, . . . , St3.1 via a computing unit 702. In this case, pairs of the arrangements vary. In this case, the plurality of arrangements can be all possible permutations of the first protocol steps S1.1, . . . , St3.1. In this case, it is possible to specify pairs of first protocol steps S1.1, . . . , St3.1 which must not be permutated. This reduces the number of possible arrangements. An example embodiment of the first determination DET-1 of a plurality of arrangements of first protocol steps S1.1, . . . , St3.1 is shown in FIG. 5.

The next method step of the illustrated example embodiment is the second determination DET-2 of a plurality of comparison values via a computing unit 402, each comparison value being based on a comparison of the second protocol P2 with an arrangement of the first protocol steps S1.1 . . . , St3.1. Therefore the number of comparison values here corresponds to the number of arrangements of the first protocol steps S1.1, . . . , St3.1. In this case, for an arrangement of the first protocol steps S1.1, . . . , St3.1, the protocol steps S1.1, . . . , St3.1, S1.2, . . . , St3.2 of the first and second protocol can be compared in order, and a protocol step comparison value can be determined for each comparison. From the plurality of protocol step comparison values, the comparison value for the comparison of an arrangement of the first protocol steps S1.1, . . . , St3.1 can be determined. The number of protocol step comparison values corresponds to the number of first or second protocol steps S1.1, . . . , St3.2, depending on which of the protocols comprises a larger number of protocol steps S1.1, . . . , St3.2. The comparison value for the comparison of a first arrangement of the first protocol steps S1.1, . . . , St3.1 with a second protocol P2 is preferably calculated by adding all associated protocol comparison values. The comparison value can however also be calculated using other mathematical approaches, e.g. the comparison value can correspond to the arithmetic, geometric or harmonic average of all protocol step comparison values, or the comparison value can correspond to the median of all protocol step comparison values.

The next method step of the illustrated example embodiment is the third determination DET-3 of an agreement value based upon the plurality of comparison values via a computing unit 702. In this case, the maximum of the plurality of the comparison values is preferably determined as an agreement value. However, other mathematical operations are also possible for determining the agreement value based upon the plurality of comparison values. For example, the agreement value can be the minimum or the average of the plurality of comparison values.

The next method step of the illustrated example embodiment is the provision PROV of the agreement value via an interface 701. In this case, the provision PROV can include storage, transfer and/or display of the agreement value. If the agreement value is determined from the maximum of the comparison values, the associated arrangement of the first protocol steps S1.1, . . . , St3.1, which in the comparison with the second protocol P2 resulted in the maximum comparison value and hence the agreement value, can be provided together with the agreement value.

Figure 2:
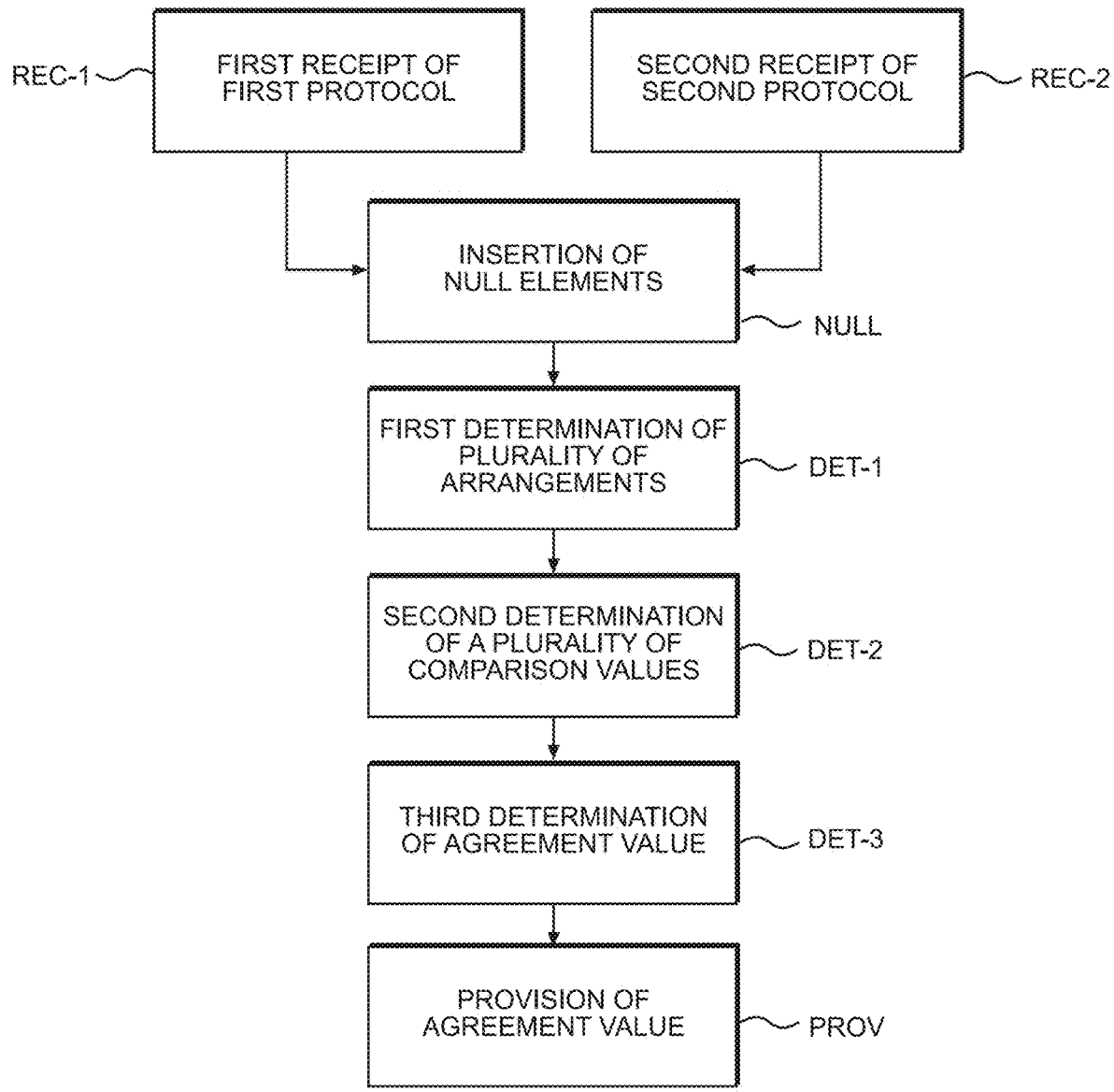
FIG. 2 shows a flow diagram of a second example embodiment for comparing protocols.

FIG. 2 shows a flow diagram of a second example embodiment of the method for comparing protocols P1, P2, P3, P1', P2'. The method steps of the first receipt REC-1, the second receipt REC-2, the first determination DET-1, the second determination DET-2, the third determination DET-3 and the provision PROV are performed in a similar manner to the description of the first example embodiment.

A further method step of the illustrated second example embodiment is the insertion of null elements NULL following the receipt REC-1, REC-2 of the first protocol P1 and second protocol P2. In this case, the second protocol P2 comprises a plurality of second protocol steps S1.2, . . . , St3.2. The number of first protocol steps S1.1, . . . , St3.1 may vary from the number of second protocol steps S1.2, . . . , St3.2. This may be due to e.g. insertion and/or removal of individual protocol steps S1.1, . . . , St3.2 in one of the two protocols P1, P2. The insertion and/or removal may be implemented when a protocol P1, P2 is being adapted to a measurement process by a user. The insertion and/or removal takes place independently of the claimed method for comparing protocols. In this example embodiment, the first protocol P1 comprises seven protocol steps and the second protocol P2 comprises nine protocol steps. For the second determination DET-2 of a plurality of comparison values in this second example embodiment, the number of first and second protocol steps S1.1, . . . , St3.2 should advantageously be identical. In order to achieve this, null elements Null.1 are inserted into the first protocol P1 with the smaller number of protocol steps S1.1, . . . , St3.1, so that the number of first and second protocol steps S1.1, . . . , St3.2 including the null elements Null.1 is identical. This means that a null element Null.1 of the originally shorter first protocol P1 can be assigned to two protocol steps R3.2, R6.2 of the second protocol P2, which has more protocol steps S1.2, . . . , St3.2 that vary from null. In alternative example embodiments, the first protocol P1 can comprise more protocol steps S1.1, . . . , St3.1 than the second protocol P2.

Figure 3:
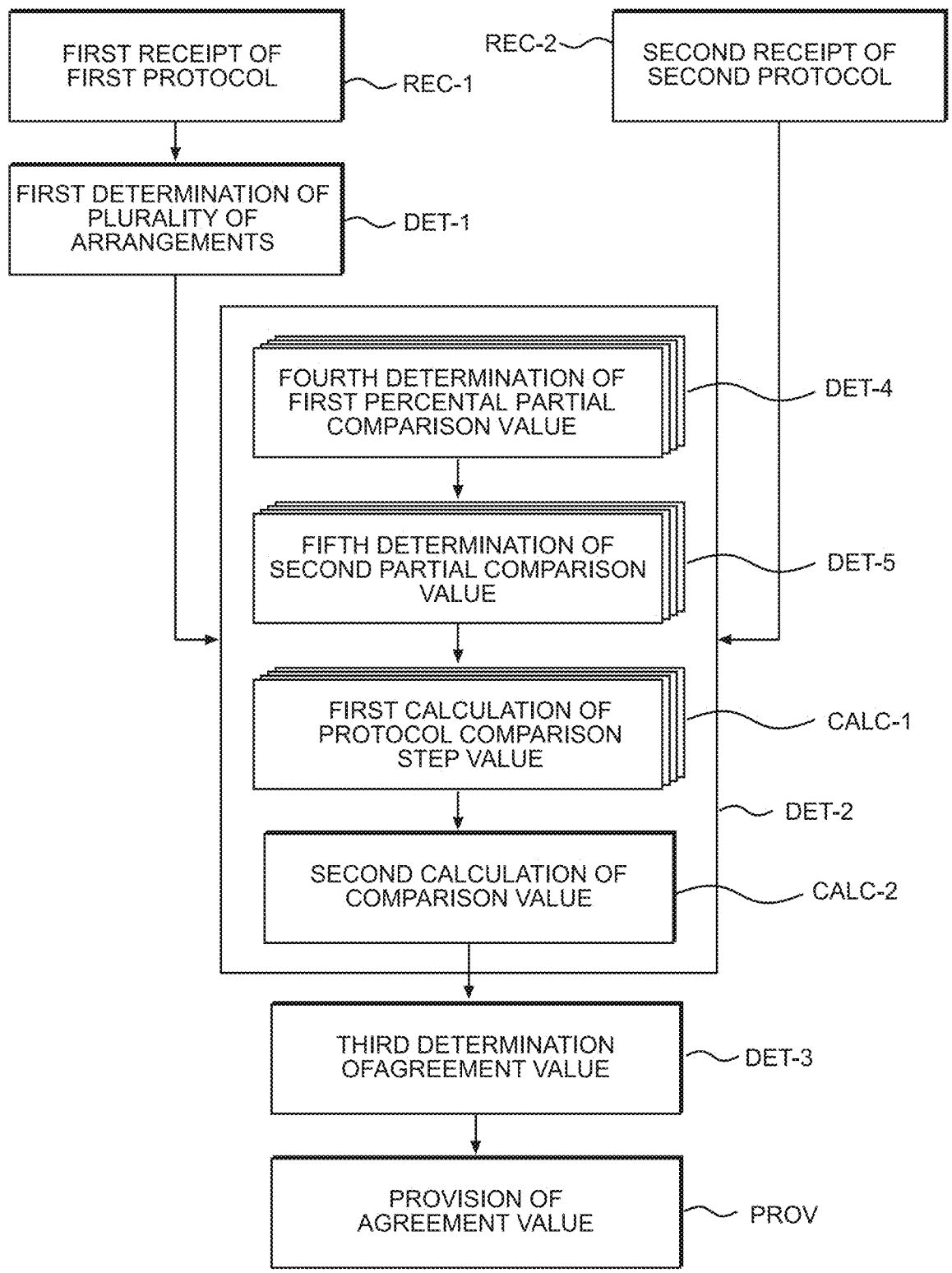
FIG. 3 shows a flow diagram of the steps of the second determination of a plurality of comparison values.

FIG. 3 shows the partial method steps of the second determination DET-2 of the plurality of comparison values in detail. For this purpose, the determination of a comparison value for an arrangement of the first protocol steps S1.1, . . . , St3.1 with a second protocol P2 is divided into partial method steps.

Figure 7:
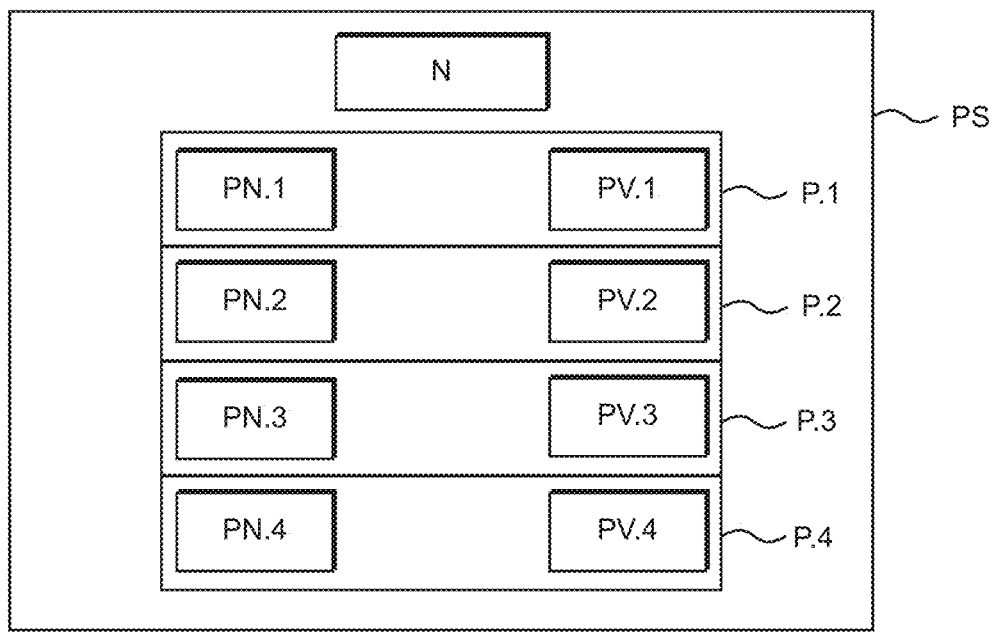
FIG. 7 shows a schematic diagram of the structure of a protocol step.

In this case, a protocol step S1.1, . . . , St3.1, S1.2, . . . , St3.2 is structured as described in FIG. 7.

The first partial method step of the second determination DET-2 is the fourth determination DET-4 of a first percental partial comparison value based on the protocol step identifier of the first protocol step S1.1, . . . , St3.1 that is to be compared and the protocol step identifier N of the corresponding second protocol step S1.2, . . . , St3.2. Said percental partial comparison value can be calculated in this case by comparing the characters of the two protocol step identifiers N. For example, the same characters in the same order from two protocol step identifiers N can be determined and a percental value output. This means that e.g. the protocol step identifiers N "X-ray Thorax" and "X-ray- Thorax" have an agreement of approximately 93%, since thirteen of the fourteen characters agree in the same order. Alternatively, a system can be taught a set of synonyms based upon which the similarity of the two protocol step identifiers N can be determined. It is then possible to determine 100% agreement for protocol step identifiers N such as "X-ray Thorax" and "X-ray Upper body". In this context, taught means that the system is provided with a data series which defines, for specific cases, the degree to which these cases are similar.

The second partial method step of the second determination DET-2 is the fifth determination DET-5 of a second partial comparison value based on the parameter pairs P.1, P.2, P.3, P.4 of the first and second of the first S1.1, . . . , St3.1 and second S1.2, . . . , St3.2 protocol steps that are to be compared. In this case, the parameter values PV.1, PV.2, PV.3, PV.4 of two reciprocally corresponding parameter identifiers PN.1, PN.2, PN.3, PN.4 of the first S1.1, . . . , St3.1 and the second S1.2, . . . , St3.2 protocol step are compared. In this case, parameter values PV.1, . . . , PV.4 whose associated parameter identifiers PN.1, . . . , PN.4 are identical in the first S1.1, . . . , St3.1 and second S1.2, . . . , St3.2 protocol step are advantageously compared. Alternatively, an intermediate comparison value can be determined for the parameter identifiers PN.1, . . . , PN.4, in a similar way to the fourth determination DET-4 of the first partial comparison value. If this intermediate comparison value is larger than a preset threshold value, the assigned parameter values PV.1, . . . , PV.4 of the compared parameter identifiers PN.1, . . . , PN.4 can be compared. In this case, a distinction is made between numerical and string parameter values PV.1, . . . , PV.4. String values include combinations of characters. In the case of numerical parameter values PV.1, . . . , PV.4, a 1 is advantageously added to the second partial comparison value if both parameter values PV.1, . . . , PV.4 are identical and a 0 is added otherwise. Alternatively, instead of a 0, it is also possible to determine a percental value from the divergence of the two parameter values PV.1, . . . , PV.4 and add this percental value to the second partial comparison value. If the parameter values PV.1, . . . , PV.4 are string values, a percental value describing the similarity of the two string values is added to the second partial comparison value, as per the fourth determination DET-4.

The third partial method step of the second determination DET-2 is the first calculation CALC-1 of a protocol step comparison value, for the first S1.1, . . . , St3.1 and second S1.2, . . . , St3.2 protocol step that are to be compared, via adding the first and the second partial comparison value. Alternatively, the protocol step comparison value can also be formed by a weighted sum of the first partial comparison value and the second partial comparison value.

The fourth partial method step of the second determination DET-2 is the second calculation CALC-2 of the comparison value based upon the protocol step comparison values. For this purpose, all protocol step comparison values are preferably added or summed to give the comparison value. This means that the comparison value is the sum of the protocol step comparison values. Alternatively, it is also possible to determine the average of the protocol step comparison values.

In the illustrated example embodiment, the steps of the fourth determination DET-4, the fifth determination DET-5 and the first calculation CALC-1 are performed multiple times, in particular once per protocol step S1.1, . . . , St3.2. In the final partial method step of the second calculation CALC-2 of the second determination DET-2, a comparison value for the comparison of a first arrangement of the first protocol steps S1.1, . . . , St3.1 with a second protocol P2 is calculated from all of the protocol step comparison values, and therefore the second calculation CALC-2 is only performed once per comparison.

Figure 4:
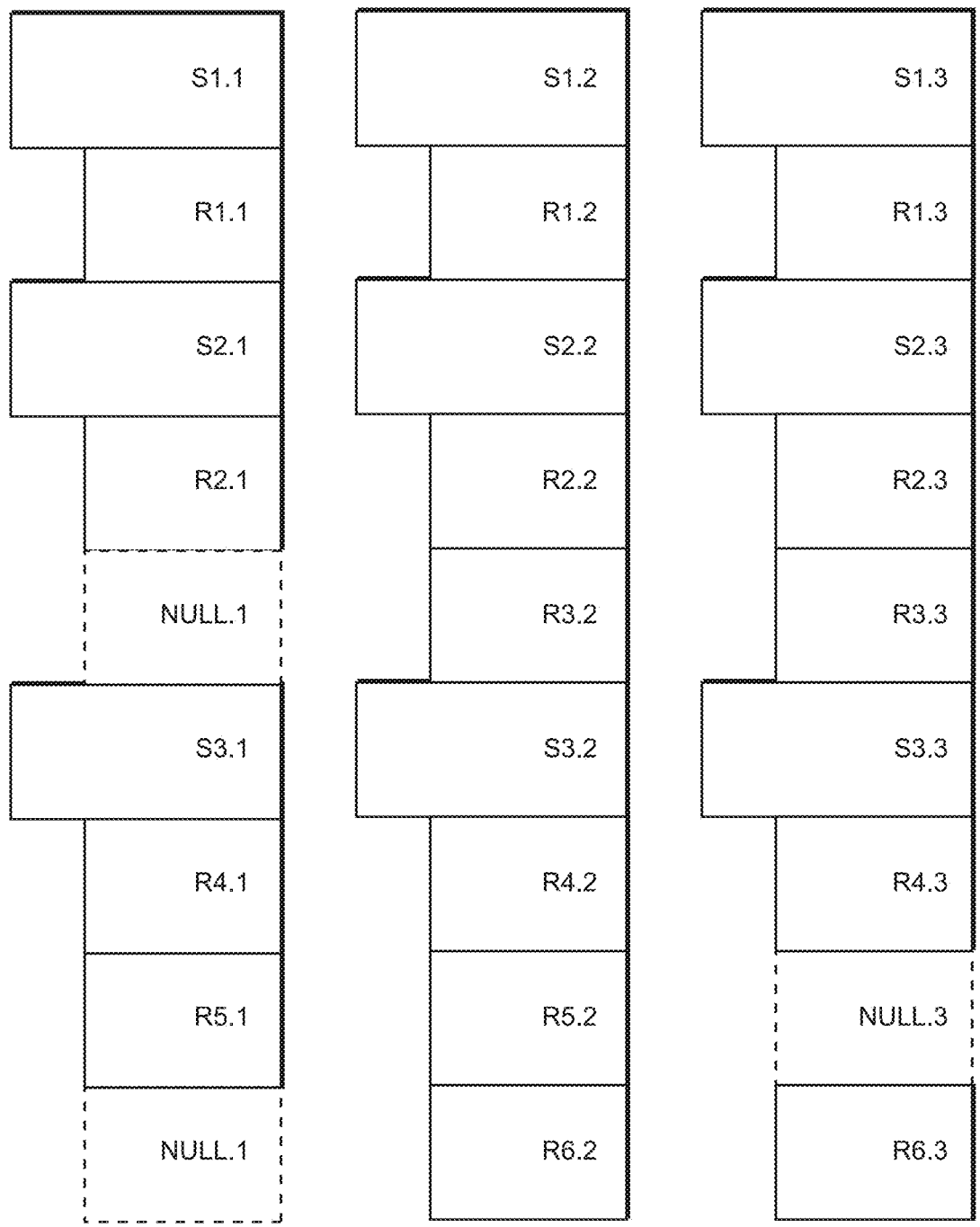
FIG. 4 shows a schematic diagram of a subordination structure using the example of three protocols.

FIG. 4 shows a subordination structure in three different protocols P1, P2, P3. Each of the three protocols P1, P2, P3 comprises three scan protocol steps S1.1, S2.1, S3.1, S1.2, S2.2, S3.2, S1.3, S2.3, S3.3. The first protocol P1 here comprises three scan protocol steps S1.1, S2.1, S3.1, the second protocol P2 comprises three scan protocol steps S1.2, S2.2, S3.2, and the third protocol P3 comprises three scan protocol steps S1.3, S2.3, S3.3. Each of these scan protocol steps has subordinate reconstruction protocol steps R1.1, R2.1, R4.1, R5.1, R1.2, R2.2, R3.2, R4.2, R5.2, R6.2, R1.3, R2.3, R3.3, R4.3, R6.3. For example, the scan protocol step S1.1 of the first protocol P1 has one subordinate reconstruction protocol step R1.1, the second scan protocol step S2.1 of the first protocol P1 has one subordinate reconstruction protocol step R2.1 and the third scan reconstruction step S3.1 of the first protocol has two further subordinate reconstruction protocol steps R4.1, R5.1. The assignments in the second P2 and third P3 protocol can be taken from FIG. 4 likewise.

In the illustrated example embodiment, the first protocol P1 is identical to the first protocol used in the methods described with reference to FIG. 1 to FIG. 3. Furthermore, the second protocol P2 is identical to the second protocol used in the methods described with reference to FIG. 1 to FIG. 3. It is however easily possible to use any of the protocols P1, P2, P3 as first protocol and/or as second protocol in the methods described in relation to FIG. 1 to FIG. 3.

In order that the protocols P1, P2, P3 can be compared, null elements Null.1, Null.3 have been inserted so that the protocols comprise the same number of protocol steps S1.1, S2.1, S3.1, S1.2, S2.2, S3.2, S1.3, S2.3, S3.3, R1.1, R2.1, R4.1, R5.1, R1.2, R2.2, R3.2, R4.2, R5.2, R6.2, R1.3, R2.3, R3.3, R4.3, R6.3, Null.1, Null.3. In order to achieve this, the numbers of scan protocol steps S1.1, . . . , S3.3 are first assigned to each other. Since all three protocols comprise the same number of scan protocol steps S1.1, . . . , S3.3, no null elements were inserted for the comparison of the scan protocol steps S1.1, . . . , S3.3. Following thereupon, the reconstruction protocol steps R1.1, . . . , R6.3, which are subordinate in each case to scan protocol steps S1.1, . . . , S3.3 that are assigned to each other, were compared. Since in the illustrated example embodiment only the respective numbers of reconstruction protocol steps R1.1, . . . , R6.3 differ, null elements Null.1, Null.3 were inserted at this level. For example, a null element Null.1 was therefore subordinated to the second scan protocol step S2.1 of the first protocol P1, because the second scan protocol steps S2.2, S2.3 of the second P2 and third P3 protocol each have two subordinate reconstruction protocol steps R2.2, R3.2, R2.3, R3.3. This means that the second scan protocol step S2.1 of the first protocol P1 likewise has two subordinate protocol steps R2.1, Null.1. The same applies analogously to the other positions at which null elements Null.1, Null.3 have been inserted. It is then possible to compare the three protocols P1, P2, P3 more effectively. The detailed process of the comparison while retaining the subordination structure is outlined in FIG. 6. A user or operator can preferably specify a comparison protocol P1, P2, P3. Alternatively, the protocol P2 serves as the comparison protocol, in which the smallest number of null elements Null.1, Null.3 were inserted. In the case of the comparison protocol P2, the protocol steps S1.2, S2.2, S3.2, R1.2, R2.2, R3.2, R4.2, R5.2, R6.2 are not permutated. All further protocols P1, P3 are compared with this comparison protocol P2. For this, the agreement values for all possible/permitted permutations of the other protocols P1, P3 with this comparison protocol P2 are determined in accordance with the method described above or in the following. In the example embodiment shown, the second protocol P2 is the comparison protocol because no null elements Null.1, Null.3 were inserted into this protocol.

In the context of the permutation of the protocol steps S1.1, S2.1, S3.1, S1.2, S2.2, S3.2, S1.3, S2.3, S3.3, R1.1, R2.1, R4.1, R5.1, R1.2, R2.2, R3.2, R4.2, R5.2, R6.2, R1.3, R2.3, R3.3, R4.3, R6.3, Null.1, Null.3 for the purpose of determining the plurality of comparison values, the subordination structure in the illustrated example embodiment must not be changed. Each scan protocol step S1.1, ..., S3.3 is assigned the same reconstruction protocol steps R1.1, ..., R6.3 irrespective of the permutation. This means that, for example, in this example embodiment only the two reconstruction protocol steps R4.1, R5.1 and the null element Null.1 which are subordinate to the third scan protocol step S3.1 of the first protocol P1 can be permutated among themselves. The reconstruction steps R4.1, R5.1 and the null element Null.1 which are subordinate to the third scan protocol step S3.1 of the first protocol cannot be permutated with the reconstruction protocol step R1.1 which is subordinate to the first scan protocol step S1.1, for example. Furthermore, comparisons of scan protocol steps S1.1, ..., S3.3 with reconstruction protocol steps R1.1, ..., R6.3 are ruled out. For this reason, it is advantageous firstly to determine a comparison value for the comparison of the scan protocol steps S1.1, S2.1, S3.1, S1.2, S2.2, S3.2, S1.3, S2.3, S3.3, for an arrangement of the first scan protocol steps S1.1, S2.1, S3.1 with the second scan protocol steps S1.2, S2.2, S3.2, which are left in their original order. Original order means that the respective protocol steps S1.1, ..., R6.2 are arranged in the same order that they were arranged in when the protocol P1, P2, P3 was transferred. In other words, the protocol steps S1.1, ..., R6.2 when arranged in the original order have not yet been permutated. Following thereupon, comparison values of the reconstruction protocol steps R1.1 ..., R6.2 can be determined for two scan reconstruction steps S1.1, ..., S3.2 that are assigned to each other. In this way, only those first and second reconstruction protocol steps R1.1, ..., R6.2 which are subordinate to first and second scan protocol steps S1.1, ..., S3.2 that have already been assigned to each other are compared in each case. In this case, if the second protocol P2 is the comparison protocol, various permutations of the reconstruction protocol steps R4.1, R5.1 and the null element Null.1 of the first protocol P1 are therefore compared with the reconstruction protocol steps R4.2, R5.2, R6.2 of the second protocol P2, since the superordinate scan protocol steps S3.1 S3.2 are assigned to each other for the current arrangement of the first scan protocol steps S1.1, S2.1 S3.1. For a different arrangement of the first scan protocol steps S1.1, S2.1 S3.1, other reconstruction protocol steps R1.1, ..., R6.2 are compared with each other. The same applies analogously to a comparison of the third protocol P3 with one of the other two protocols P1, P2, wherein the comparison protocol is preferably P2.

More than two protocols P1, P2, P3 can therefore be transferred, wherein all protocols P1, P2, P3 are compared with the comparison protocol. In this case, the comparison protocol is not compared with itself. This applies to all example embodiments. For the sake of simplification, only the comparisons between two protocols P1, P2, P3 are described. However, these comparisons can be repeated for any number of transferred protocols P1, P2, P3. The protocols P1, P2, P3 do not have to be of the same type in this case. This means that they can describe different measurements or be applicable on different medical devices, for example. Alternatively, they may be temporally varying versions of a protocol P1, P2, P3. In a preferred variant, the comparison protocol P1, P2, P3 is specified manually. Alternatively, the comparison protocol P2 is determined as the protocol P2 having the smallest number of inserted null elements Null.1, Null.3. In other words, the protocol P1, P2, P3 selected as the comparison protocol is that into which the smallest number of null elements Null.1, Null.3 has been inserted.

FIG. 5 shows a schematic diagram for the determination DET-3 of a plurality of comparison values from a plurality of permutations of the protocol steps St1.1, St2.1, St3.1, St1.2, St2.2, St3.2 of two protocols P1', P2'. In particular, the protocol steps St1.1, ..., St3.2 can be scan protocol steps S1.1, ..., S3.3, reconstruction protocol steps R1.1, ..., R6.3 and/or null elements Null.1, Null.3. In the illustrated example embodiment, no conditions are specified which prohibit the transposition of individual protocol steps S1.1, ..., S3.3. In alternative example embodiments, conditions can be specified for individual protocol steps S1.1, ..., S3.3 which prohibit the transposition of individual protocol steps S1.1, ..., S3.3. The number of arrangements is reduced in this case. In the illustrated example embodiment, protocols P1', P2' without a subordination structure are shown, though the method described can also readily be applied to protocols P1', P2' with a subordination structure. The first protocol P1' comprises three first protocol steps St1.1, St2.1, St3.1 and the second protocol P2' comprises three second protocol steps St1.2, St2.2, St3.2. The second protocol P2' is specified as the comparison protocol here. This means that the arrangement of the second protocol steps St1.2, St2.2, St3.2 is kept constant. In other words, the order of the second protocol steps St1.2, St2.2, St3.2 is not changed. The arrangements in the illustrated example embodiment correspond to all permutations of the second protocol steps St1.2, St2.2, St3.2. In the illustrated example embodiment, in the step of the first determination DET-1, all possible six permutations of the three protocol steps St1.1, St2.1, St3.1 of the first protocol P1' are determined. It is consequently possible in the step of the second determination DET-2 to determine six comparison values of the arrangements of the first protocol steps St1.1, St2.1, St3.1 with the second protocol P2'. These six comparison values are used for the third determination DET-3 of the agreement value. The agreement value is preferably determined as the maximum of the comparison values. The maximum of the comparison values is produced by that arrangement of the first protocol steps St1.1, St2.1, St3.1 which best agrees with the second protocol P2'. This means that the first protocol P1' with the corresponding arrangement of the protocol steps St1.2, St2.2, St3.2 and the second protocol P2', in comparison with all other arrangements of the protocol steps St1.2, St2.2, St3.2 of the first protocol P1', are the most similar.

Figure 6:
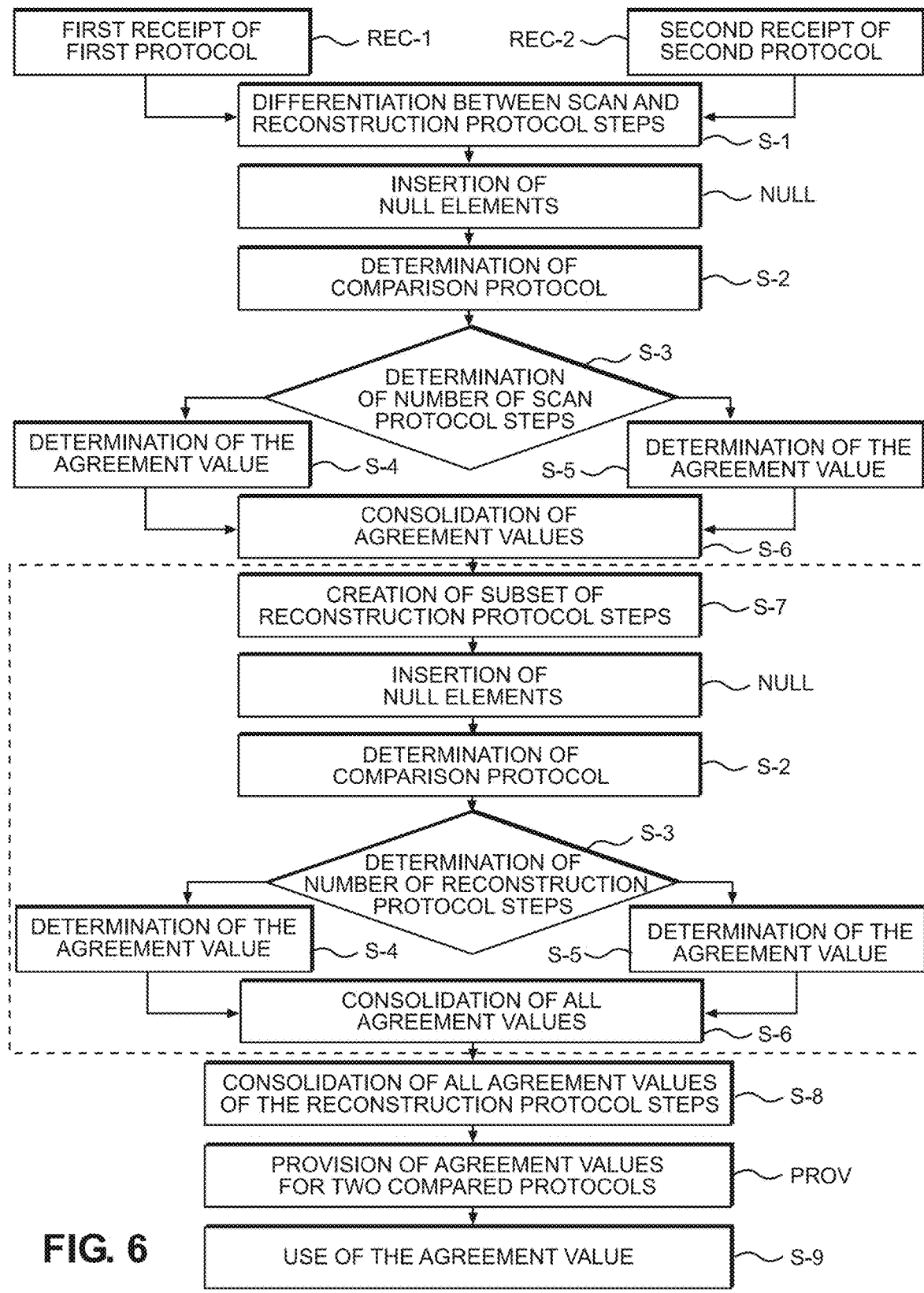
FIG. 6 shows a flow diagram of a third example embodiment for comparing protocols.

FIG. 6 shows a flow diagram of a third example embodiment of the method for comparing protocols P1, P2, P3, P1', P2'. The method steps of the first receipt REC-1 and of the second receipt REC-2 are performed in a similar manner to the description of the first example embodiment.

The third method step of the illustrated example embodiment is the differentiation S-1 between scan protocol steps S1.1, ..., S3.3 and reconstruction protocol steps R1.1, ..., R6.3 of the first and second protocol steps S1.1, ..., S3.3, R1.1, ..., R6.3. The differentiation is based on a specially inserted parameter pair P.1, ..., P.4 of the first and second protocol step S1.1, ..., S3.3, R1.1, ..., R6.3, which indicates whether it is a scan protocol step S1.1, ..., S3.3 or a reconstruction protocol step R1.1, ..., R6.3. In the following method steps, the insertion NULL of null elements Null.1, Null.3, the determination S-2 of the comparison protocol, the determination S-3 of the number of scan protocol steps S1.1, ..., S3.3, the determination S-4, S-5 of the agreement value via one of the two variants described below, and the consolidation S-6 of all agreement values, only the first S1.1, S2.1, S3.1 and second S1.2, S2.2, S3.2 scan protocol steps are examined.

The next method step is the insertion NULL of null elements Null.1, Null.3 into the list of scan protocol steps S1.1, ..., S3.3, such that all protocols P1, P2, P3, P1', P2' have the same number of scan protocol steps S1.1, ..., S3.3.

The next method step is the determination S-2 of the comparison protocol P1, P2, P3, P1', P2'. In this example embodiment, the user can indicate which of the protocols P1, P2, P3, P1', P2' will be used in this case as the second protocol P1, P2, P3, P1', P2', i.e. as the comparison protocol P1, P2, P3, P1', P2', i.e. against which the first protocol P1, P2, P3, P1', P2' will be compared. This means that the arrangement of protocol steps S1.1, ..., S3.3, R1.1, ..., R6.3 of the comparison protocol P1, P2, P3, P1', P2' is kept constant during the determination of the comparison values DET-2 and the arrangement of the protocol steps S1.1, ..., S3.3, R1.1, ..., R6.3 of the other protocol P1, P2, P3, P1', P2' is varied. The selection of the comparison protocol by the user can also be performed already at the time of receipt REC-1, REC-2 of the two protocols P1, P2, P3, P1', P2'.

Alternatively, the comparison protocol P2 can be determined according to the number of inserted null elements Null.1, Null.3. This can be the second protocol P2 with the smallest number of inserted null elements Null.1, Null.3. All other first protocols P1 are compared with this comparison protocol P2, and the arrangement of the protocol steps, which are limited to the scan protocol steps S1.1, ..., S3.2 in this method step, of the comparison protocol P2 is kept constant.

For the sake of simplicity, only the comparison between a comparison protocol P2 which corresponds to the second protocol P2 and a first protocol P1 is described below. In this case, a plurality of first protocols P1 can be transferred for comparison with the comparison protocol P2. The first protocol P1 can optionally be the second protocol P2 and vice versa. The method steps are repeated for each further first protocol P1 with the comparison protocol P2, and the calculated values, such as the agreement value and advantageously the arrangement of protocol steps S1.1, ..., S3.2 which resulted in said agreement value, are returned for each protocol P1.

The next method step is the determination S-3 of the number of scan protocol steps S1.1, ..., S3.2. This method step is used to decide how the comparison of the scan protocol steps S1.1, ..., S3.2 should be carried out.

If the number of scan protocol steps S1.1, ..., S3.2 in one of the protocols P1, P2 is smaller than ten, the determination S-4 of the agreement value is based on the permutations comparison described in FIG. 5. This comprises the method steps of the first determination DET-1, the second determination DET-2 and the third determination DET-3. In the first determination DET-1 of a plurality of arrangements of the first scan protocol steps S1.1, ..., S3.1, conditions are specified. These include the condition that the order of the scan protocol steps S1.1, ..., S3.1 is not changed and only the position of the inserted null elements Null.1 is permutated. In this way, an agreement value for the scan protocol steps S1.1, ..., S3.2 of the two protocols P1, P2 is determined. The agreement value is advantageously the maximum of all comparison values. The comparison values are the sum of all protocol step comparison values, wherein each comparison value is based on an arrangement of the scan protocol steps S1.1, S2.1, ..., S3.2 including the null element Null.1, wherein pairs of said arrangements vary.

If there are at least ten (ten or more) scan protocol steps S1.1, ..., S3.2 in one of the protocols P1, P2, a fast-forward algorithm is used for the determination S-5 of the agreement value for reasons of computing time. For the first scan protocol step S1.2 of the comparison protocol P2, the most closely matching scan protocol step S1.1, S2.1, S3.1 of the protocol P1 that is to be compared is sought. The comparison is performed as described above based upon the protocol step identifiers and the parameter pairs. Following thereupon, for the second scan protocol step S2.2 of the comparison protocol P2, the most closely matching scan protocol step S1.1, S2.1, S3.1 of the protocol P1 to be compared is likewise sought, wherein the already assigned scan protocol step S1.1, S2.1, S3.1 of the protocol P1 to be compared is ignored. These method steps are performed for each scan protocol step S1.2, S2.2, S3.2 of the comparison version P2. The agreement value corresponds to the sum of the comparison values of the scan protocol steps S1.1, ..., S3.2 assigned to each other from the two protocols P1, P2.

The next method step is the consolidation S-6 of all agreement values of the scan protocol steps S1.1, ..., S3.2 and the arrangements of the scan protocol steps S1.1, ..., S3.2 which resulted in this agreement value. The consolidation S-6 comprises the creation of a file in which the agreement value and the associated arrangement of the scan protocol steps S1.1, ..., S3.2 are stored for each comparison, and which can be output. In this way, an agreement value and an associated arrangement for the agreement value are determined in the foregoing method steps for two protocols P1, P2 in each case. In this case, the agreement value is advantageously the maximum comparison value from the comparison of a plurality of arrangements of the scan protocol steps S1.1, ..., S3.2 of the protocols to be compared P1, P2. This is necessary in particular if more than two protocols are to be compared, since a plurality of agreement values and associated arrangements are determined in the foregoing method steps.

Following thereupon, the method steps described above (the insertion NULL of null elements Null.1, the determination S-2 of the comparison protocol, the determination S-3 of the number of reconstruction protocol steps R1.1, ..., R6.2, the determination S-4, S-5 of the agreement value via one of the two variants described below, and the consolidation S-6 of all agreement values) are performed analogously for the reconstruction protocol steps R1.1, ..., R6.2. In this case, the previous assignment of the scan protocol steps S1.1, ..., S3.2 is however taken into consideration and the comparison of the reconstruction protocol steps R1.1, ..., R6.2 is performed in a loop based upon this subordination structure. This loop is illustrated by the broken line.

The first method step within this loop comprises the creation S-7 of a subset of the reconstruction protocol steps R1.1, ..., R6.2 of the first and second protocol P1, P2 in each case, wherein the superordinate scan protocol steps S1.1, ..., S3.2 of the subset of the reconstruction steps R1.1, ..., R6.2 of the first and second protocol P1, P2 were assigned to each other in the preceding method steps.

The subsequent method steps (the insertion NULL of null elements Null.1, the determination S-2 of the comparison protocol, the determination S-3 of the number of reconstruction protocol steps R1.1, . . . , R6.2, the determination S-4, S-5 of the agreement value via one of the two variants described below, and the consolidation S-6 of all agreement values) are performed analogously for the subset of reconstruction protocol steps R1.1, . . . , R6.2 as described above for the scan protocol steps S1.1, . . . , S3.2.

For the determination S-4 of the agreement value via permutation comparison, only the conditions relating to the permutations are lifted. For the reconstruction protocol steps R1.1, . . . , R6.2, each possible permutation of the examined subset of the reconstruction protocol steps R1.1, . . . , R6.2 of a protocol P1, P2 is compared with the assigned subset of the reconstruction protocol steps R1.2, . . . , R6.2 of the comparison protocol P1, P2. This is repeated for each subset of reconstruction protocol steps R1.1, . . . , R6.2 for each assignment of two scan protocol steps S1.1, . . . , S3.2.

The next method step outside the loop comprises the consolidation S-8 of all agreement values of the reconstruction protocol steps R1.1, . . . , R6.2 from the individual loop executions and of the scan protocol steps S1.1, . . . , S3.2. In order to achieve this, the agreement values resulting from the comparison of two protocols P1, P2 are added and the corresponding arrangement of the scan protocol steps S1.1, . . . , S3.2 is consolidated with the corresponding arrangement of the subsets of the reconstruction protocol steps R1.1, . . . , R6.2. An agreement value for the comparison of two protocols P1, P2 is therefore determined from the sum of all agreement values of the subsets of all protocol steps S1.1, . . . , R6.2.

The final method step is the provision PROV of this agreement value for the two compared protocols P1, P2, preferably with the associated arrangement of the protocol steps S1.1, . . . , R6.2 which resulted in the corresponding agreement value. If more than two protocols P1, P2 are compared, the agreement values and the arrangements for all comparisons are provided.

Following thereupon, the method step comprising the use S-9 of the agreement value can optionally be performed in example embodiments. The method step S-9 can comprise one of the two method steps described below. In a first example embodiment, based upon the agreement value and the associated arrangement, an arrangement of a first protocol P1, which arrangement is associated with the agreement value, can be replaced by a second protocol P2 or deleted if the agreement value exceeds a predetermined threshold value. It is thereby possible to ensure that two protocols correspond to each other if the measurements that are to be executed by the protocols P1, P2 are intended to be comparable. As a result of deleting a second protocol P2 which is very similar to a first protocol P1, storage space is saved, thereby helping to optimize the centralized management of protocols using a protocol management system. Alternatively, the two protocols P1, P2 for which the agreement value exceeds the threshold value cannot be replaced or deleted, because they are incompatible. This may be the case in particular if both protocols P1, P2 are configured for medical devices from different manufacturers or for different software environments. It is then possible, from a plurality of first protocols P1, to determine a protocol P1 which is incompatible and corresponds to a second protocol P2, this being the comparison protocol, and for which the agreement value exceeds a given threshold value. Using this first protocol P1, it is possible to control a second medical device, said second medical device being incompatible with the first medical device for which the first protocol P1 is configured, if comparable measurement and/or reconstruction processes are to be performed on both medical devices. A uniformity of the performance of measurement and/or reconstruction processes is thereby ensured, even if the two medical devices are not compatible with each other.

FIG. 7 shows the structure of a protocol step PS. All first protocol steps S1.1, . . . , St3.1, second protocol steps S1.2, . . . , St3.2, scan protocol steps S1.1, . . . , S3.3, reconstruction protocol steps R1.1, . . . , R6.3 and all further protocol steps S1.3, S2.3, S3.3, R1.3, R2.3, R3.3, R4.3, R6.3 are structured in accordance with this schematic diagram. The protocol step PS in this figure has therefore been assigned a superordinate reference sign which applies to all cited protocol step types (first protocol steps S1.1, . . . , St3.1, second protocol steps S1.2, . . . , St3.2, scan protocol steps S1.1, . . . , S3.3, reconstruction protocol steps R1.1, . . . , R6.3 and further protocol steps S1.3, . . . , R6.3).

The protocol step PS comprises a protocol step identifier N. This protocol step identifier advantageously describes the type of examination and/or the body part which is described by the protocol step PS and which is to be examined via the examination described by the protocol step PS. For example, a protocol step identifier PS may be "X-ray Thorax". Moreover, the protocol step PS comprises four parameter pairs P.1, P.2, P.3, P.4. In alternative embodiments, a protocol step can comprise more or less than four parameter pairs P.1, . . . , P.4 in this case. Each parameter pair P.1, . . . , P.4 comprises a parameter identifier PN.1, PN.2, PN.3, PN.4 and a parameter value PV.1, PV.2, PV.3, PV.4. In this case, each parameter identifier PN.1, . . . , PN.4 is assigned a parameter value PV.1, . . . , PV.4. In this case, the parameter identifier PN.1, . . . , PN.4 describes the parameter, e.g. "Acquisition time". The associated parameter value PV.1, . . . , PV.4 describes the value to be set for the examination that is described by the protocol step. The parameter value PV.1, . . . , PV.4 for which the assigned parameter identifier PN.1, . . . , PN.4 is e.g. "Acquisition time" can be "10 ms", for example. Any other parameter pair P.1, . . . , P.4 is conceivable in this case. The parameter value PV.1, . . . , PV.4 can also be a string value such as e.g. "on" or "off" in this case. If a parameter identifier PN.1, . . . , PN.4 in a protocol step PS is not needed or defined, the associated parameter value PV.1, . . . , PV.4 can be empty.

Figure 8:
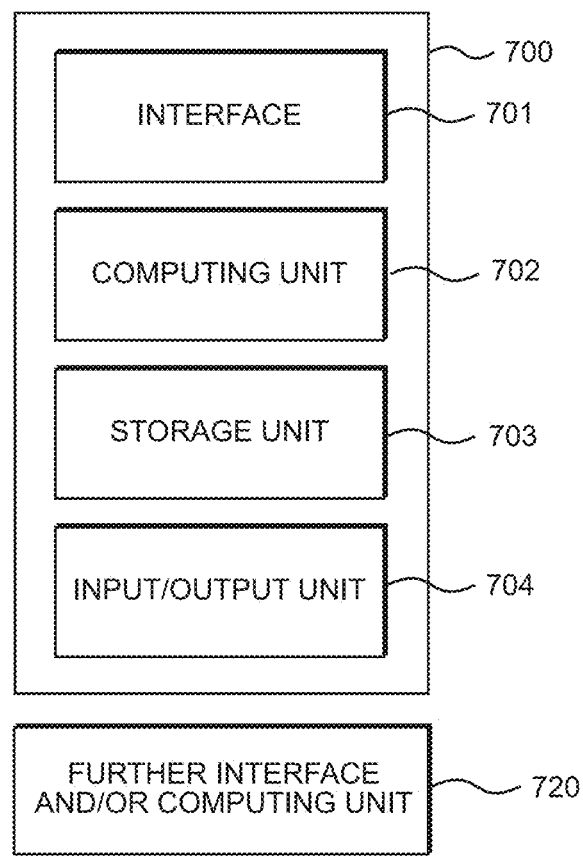
FIG. 8 shows a comparison device for comparing protocols.

FIG. 8 shows a comparison device for comparing protocols 700 in order to determine an agreement value. The comparison device 700 shown here is configured to execute a method according to the invention. This comparison device 700 comprises an interface 701, a computing unit 702, a storage unit 703 and an input/output unit 704. In this case, the interface 701 can comprise in particular further interfaces or subsidiary interfaces. Furthermore, the computing unit 702 can comprise in particular further computing units or subsidiary computing units.

The comparison device 700 can be in particular a computer, a microcontroller or an integrated circuit. Alternatively, the comparison device 700 can be a real or virtual group of computers (a real group is known as a "cluster", and a virtual group as a "cloud").

An interface 701 can be a hardware or software interface (e.g. a PCI bus, USB or Firewire). A computing unit 702 can have hardware elements or software elements, e.g. a microprocessor or a so-called FPGA (Field Programmable Gate Array). A storage unit 703 can be realized as non-permanent working memory (Random Access Memory: RAM) or as permanent mass memory (hard disk, USB stick, SD card, solid state disk). An input/output unit 704 comprises at least one input unit and/or at least one output unit. An input unit 704 can be realized in particular via a keypad and/or a mouse. An output unit 704 can be in particular a display screen. Alternatively, it can also be a printer which is designed to print out image data.

Where not explicitly described but nonetheless effective and relevant to the invention, individual example embodiments and individual partial aspects or features thereof can be combined with or substituted for each other without thereby departing from the scope of the claimed invention. Where these can be transferred, advantages of the invention that are described with reference to an example embodiment also apply to other example embodiments without this being stated explicitly.

The patent claims of the application are formulation proposals without prejudice for obtaining more extensive patent protection. The applicant reserves the right to claim even further combinations of features previously disclosed only in the description and/or drawings.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A computer-implemented method for comparing protocols, comprising:
    firstly receiving a first protocol, the first protocol relating to a performance of a measurement at a first medical device and the first protocol including a plurality of first protocol steps;
    secondly receiving a second protocol, the second protocol relating to a performance of a measurement at a second medical device;
    firstly determining a plurality of arrangements of the plurality of first protocol steps, wherein pairs of the plurality of arrangements vary;
    secondly determining a plurality of comparison values, wherein each of comparison values, of the plurality of comparison values, is based on a comparison of the second protocol with one of the plurality of arrangements of the plurality of first protocol steps;
    thirdly determining an agreement value based upon the plurality of comparison values; and
    provisioning the agreement value.

2. The computer-implemented method of claim 1, further comprising:
    replacing the first protocol on the first medical device with the second protocol, or deleting the first protocol on the first medical device, upon the agreement value exceeding a threshold value.

3. The computer-implemented method of claim 2,
    wherein the plurality of arrangements of the plurality of first protocol steps includes all permutations of the plurality of first protocol steps which satisfy a defined condition.

4. The computer-implemented method of claim 2,
    wherein the second protocol includes a plurality of second protocol steps,
    and wherein the computer-implemented method further comprises:
        inserting null elements into the first protocol or the second protocol, so that a number of the plurality of first protocol steps corresponds to a number of the plurality of second protocol steps.

5. The computer-implemented method of claim 2,
    wherein the second protocol includes a plurality of second protocol steps,
    wherein each of the comparison values is based on a plurality of comparisons of one of the plurality of first protocol steps with one of the plurality of second protocol steps.

6. The computer-implemented method of claim 2,
    wherein the first protocol is received during the firstly receiving via a user input,
    wherein the first protocol is incompatible with the second medical device, and wherein the computer-implemented method further comprises:
        controlling the second medical device based upon the second protocol upon the agreement value exceeding a threshold value.

7. The computer-implemented method of claim 1,
    wherein the first protocol is received during the firstly receiving via a user input,
    wherein the first protocol is incompatible with the second medical device, and wherein the computer-implemented method further comprises:
        controlling the second medical device based upon the second protocol upon the agreement value exceeding a threshold value.

8. The computer-implemented method of claim 1,
    wherein the plurality of arrangements of the plurality of first protocol steps includes all permutations of the plurality of first protocol steps which satisfy a defined condition.

9. The computer-implemented method of claim 1,
    wherein the second protocol includes a plurality of second protocol steps,
    and wherein the computer-implemented method further comprises:
        inserting null elements into the first protocol or the second protocol, so that a number of the plurality of first protocol steps corresponds to a number of the plurality of second protocol steps.

10. The computer-implemented method of claim 1,
wherein the second protocol includes a plurality of second protocol steps, and
wherein each of the comparison values is based on a plurality of comparisons of one of the plurality of first protocol steps with one of the plurality of second protocol steps.

11. The computer-implemented method of claim 10,
wherein each of the plurality of first protocol steps, and each of the plurality of second protocol steps, includes at least one of a protocol step identifier and a plurality of parameter pairs, wherein a parameter pair, of the plurality of parameter pairs, includes a parameter identifier and an associated parameter value, and wherein the secondly determining is further based on at least one of the protocol step identifier and the plurality of parameter pairs.

12. The computer-implemented method of claim 11,
wherein the secondly determining further comprises:
fourth determining a first partial comparison value based upon the protocol step identifier of the first protocol step that is to be compared and the protocol step identifier of the second protocol step,
fifth determining a second partial comparison value based upon the plurality of parameter pairs of the first protocol step and the plurality of parameter pairs of the second protocol step that are to be compared,
first calculating a protocol step comparison value of the first protocol step that is to be compared and the second protocol step, via adding of the first and second partial comparison values, and
second calculating the comparison value based upon the comparison values of the first protocol step and the second protocol step.

13. The computer-implemented method of claim 1,
wherein the plurality of first protocol steps include first scan protocol steps and first reconstruction protocol steps, and wherein each of the first scan protocol steps includes a plurality of subordinate first reconstruction protocol steps.

14. The computer-implemented method of claim 13,
wherein the plurality of arrangements is determined such that a subordination structure of the first scan protocol steps and the plurality of first reconstruction protocol steps is retained.

15. The computer-implemented method of claim 14, wherein during the firstly determining, only those arrangements of the plurality of first protocol steps, in which an order of the first scan protocol steps is unchanged, are determined.

16. The computer-implemented method of claim 13,
wherein during the firstly determining, only arrangements of the plurality of first protocol steps in which an order of the first scan protocol steps remains unchanged, are determined.

17. The computer-implemented method of claim 13,
wherein the second protocol includes a plurality of second protocol steps,
wherein the second protocol steps comprise second scan protocol steps and second reconstruction protocol steps, wherein each second scan protocol step, of the second protocol steps, includes a plurality of subordinate second reconstruction protocol steps,
wherein the firstly determining and the secondly determining are executed independently for the first scan protocol steps and the second scan protocol steps and for the first reconstruction protocol steps and the second reconstruction protocol steps.

18. A non-transitory computer program product storing a computer program, directly loadable into a memory of a comparison device, including program sections for executing the computer-implemented method of claim 1 when the program sections are executed by the comparison device.

19. A non-transitory computer-readable storage medium storing program sections, readable and executable by a comparison device to execute the computer-implemented method of claim 1 when the program sections are executed by the comparison device.

20. A comparison device for comparing protocols, comprising:
an interface, designed for first receipt of a first protocol relating to a performance of a measurement at a first medical device, the first protocol including a plurality of first protocol steps, and designed for second receipt of a second protocol relating to a performance of a measurement at a second medical device; and
a computing device
designed for first determination of a plurality of arrangements of the plurality of first protocol steps, wherein pairs of the plurality of arrangements vary,
designed for second determination of a plurality of comparison values, wherein each of the plurality of comparison values is based on a comparison of the second protocol with an arrangement of the plurality of first protocol steps,
designed for third determination of an agreement value based upon the plurality of comparison values, and
wherein the interface is further designed for provision of the agreement value.

* * * * *